US012731457B2

(12) United States Patent
Shepherd et al.

(10) Patent No.: US 12,731,457 B2
(45) **Date of Patent: *Sep. 8, 2026**

(54) MOBILE DEVICE FACILITATED REDEMPTION OF GAMING ESTABLISHMENT TICKET VOUCHERS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 240 days.

This patent is subject to a terminal disclaimer.

(21) Appl. No.: 18/639,449

(22) Filed: Apr. 18, 2024

(65) Prior Publication Data

US 2024/0265774 A1 Aug. 8, 2024

Related U.S. Application Data

(63) Continuation of application No. 18/093,247, filed on Jan. 4, 2023, now Pat. No. 11,990,001, which is a continuation of application No. 16/782,905, filed on Feb. 5, 2020, now Pat. No. 11,551,519.

(51) Int. Cl.
*G07F 17/32* (2006.01)

(52) U.S. Cl.
CPC ...... *G07F 17/3241* (2013.01); *G07F 17/3244* (2013.01)

(58) Field of Classification Search
CPC .......................... G07F 17/3241; G07F 17/3244
See application file for complete search history.

(56) References Cited

U.S. PATENT DOCUMENTS

| | | | | |
|---|---|---|---|---|
| 7,828,646 | B2 | 11/2010 | Franks | |
| 7,976,382 | B2 | 7/2011 | Benbrahim | |
| 8,023,715 | B2 | 9/2011 | Jones et al. | |
| 8,216,064 | B1 | 7/2012 | Muskin | |
| 8,382,583 | B2 | 2/2013 | Zinder et al. | |
| 8,407,141 | B2 | 3/2013 | Mullen et al. | |
| 8,556,707 | B2 | 10/2013 | Beer et al. | |
| 8,595,137 | B2 | 11/2013 | Sears et al. | |
| 8,958,534 | B2 | 2/2015 | Bodman | |
| 9,148,569 | B2 | 9/2015 | Resende et al. | |
| 9,153,095 | B2 | 10/2015 | Adiraju et al. | |
| 9,530,277 | B2 | 12/2016 | Nelson et al. | |
| 9,552,573 | B2 | 1/2017 | Kulpati et al. | |
| 9,672,686 | B2 | 6/2017 | Nguyen | |
| 9,747,597 | B2 | 8/2017 | Wu | |
| 9,990,801 | B2 | 6/2018 | Sanford et al. | |
| 10,297,105 | B2 | 5/2019 | Lemay et al. | |
| 10,402,815 | B2 | 9/2019 | Sharma et al. | |
| 10,636,249 | B1 * | 4/2020 | Jordan | G07F 17/3269 |
| 11,869,306 | B2 * | 1/2024 | Schwartz | G07F 17/3223 |
| 2003/0162591 | A1 * | 8/2003 | Nguyen | G07F 17/3206 463/29 |

(Continued)

FOREIGN PATENT DOCUMENTS

WO 2014078696 A2 5/2014

*Primary Examiner* — Steve Rowland
(74) *Attorney, Agent, or Firm* — Neal, Gerber & Eisenberg LLP

(57) ABSTRACT

Systems and methods that provide one or more mobile device facilitated non-cash avenues to redeem a ticket voucher associated with an amount of funds.

20 Claims, 4 Drawing Sheets

(56) References Cited

U.S. PATENT DOCUMENTS

| | | | | |
|---|---|---|---|---|
| 2003/0187798 | A1* | 10/2003 | McKinley | G08G 1/017 380/54 |
| 2004/0054623 | A1* | 3/2004 | Collins | G07F 17/329 705/39 |
| 2004/0058728 | A1* | 3/2004 | Fayter | G07F 17/32 463/25 |
| 2007/0087817 | A1 | 4/2007 | Beer et al. | |
| 2007/0203832 | A1 | 8/2007 | Babi et al. | |
| 2010/0183246 | A1* | 7/2010 | King | H04N 1/32128 382/305 |
| 2012/0078792 | A1* | 3/2012 | Bacastow | G06Q 20/4014 705/44 |
| 2012/0252567 | A1 | 10/2012 | Gagner et al. | |
| 2013/0059648 | A1* | 3/2013 | Rowe | G07F 17/3248 463/25 |
| 2013/0103582 | A1 | 4/2013 | Singfield | |
| 2013/0198071 | A1* | 8/2013 | Jurss | G06Q 20/3223 705/42 |
| 2013/0223721 | A1* | 8/2013 | Nepomniachtchi | G06V 30/2253 382/137 |
| 2014/0194195 | A1* | 7/2014 | Warner | G06Q 50/34 463/25 |
| 2014/0270463 | A1* | 9/2014 | Narendra | H04L 63/04 382/137 |
| 2015/0065231 | A1 | 3/2015 | Anderson et al. | |
| 2015/0080113 | A1 | 3/2015 | Yankton et al. | |
| 2015/0248806 | A1 | 9/2015 | Mueller | |
| 2015/0286860 | A1* | 10/2015 | Ruiz-Tapiador | H04N 1/00331 382/112 |
| 2016/0044203 | A1* | 2/2016 | Paul | H04N 1/001 705/5 |
| 2016/0171830 | A1 | 6/2016 | Curtin et al. | |
| 2017/0092054 | A1 | 3/2017 | Petersen et al. | |
| 2017/0140365 | A1* | 5/2017 | Hameed | G06F 16/13 |
| 2017/0154497 | A1 | 6/2017 | Nguyen | |
| 2017/0213199 | A1 | 7/2017 | Schwartz | |
| 2017/0262834 | A1 | 9/2017 | Curtin et al. | |
| 2018/0047249 | A1 | 2/2018 | Nelson et al. | |
| 2018/0061179 | A1 | 3/2018 | Miri et al. | |
| 2018/0082529 | A1 | 3/2018 | Mchugh et al. | |
| 2018/0211243 | A1* | 7/2018 | Ekpenyong | G06Q 20/042 |
| 2019/0043308 | A1 | 2/2019 | Higgins et al. | |
| 2019/0156541 | A1* | 5/2019 | Isgar | G06F 40/186 |
| 2019/0213832 | A1* | 7/2019 | Tsutsui | G07F 17/3246 |
| 2019/0272704 | A1* | 9/2019 | LeMay | G07F 17/3223 |
| 2019/0332757 | A1* | 10/2019 | Chen | G06V 40/45 |
| 2021/0074109 | A1* | 3/2021 | Depta | G07D 7/205 |

* cited by examiner

MOBILE DEVICE FACILITATED REDEMPTION OF GAMING ESTABLISHMENT TICKET VOUCHERS

PRIORITY CLAIM

This application is a continuation of, claims the benefit of and priority to U.S. patent application Ser. No. 18/093,247, filed on Jan. 4, 2023, which is a continuation of, claims the benefit of and priority to U.S. patent application Ser. No. 16/782,905, filed on Feb. 5, 2020, the entire contents of which are each incorporated herein by reference.

BACKGROUND

In various embodiments, the systems and methods of the present disclosure provide one or more mobile device facilitated non-cash avenues to redeem a ticket voucher associated with an amount of funds.

Gaming machines may provide players awards in primary games. Gaming machines generally require the player to place a wager to activate the primary game. The award may be based on the player obtaining a winning symbol or symbol combination and on the amount of the wager. When a player cashes out a credit balance of such gaming machines, these gaming machines may provide the player with a ticket voucher redeemable for the amount of the credit balance.

BRIEF SUMMARY

In certain embodiments, the present disclosure relates to a system including a processor, and a memory device that stores a plurality of instructions. When executed by the processor, the instructions cause the processor to receive, from a mobile device executing a mobile device application, a validation number associated with a ticket voucher. When executed by the processor, the instructions cause the processor to, independent of the receipt of the validation number associated with the ticket voucher, receive, from the mobile device executing the mobile device application, authentication data. When executed by the processor responsive to the received authentication data being associated with the ticket voucher associated with the received validation number, the instructions cause the processor to cause an amount of funds associated with the ticket voucher to be available in association with a non-cash form of payment.

In certain embodiments, the present disclosure relates to a system including a processor, and a memory device that stores a plurality of instructions. When executed by the processor, the instructions cause the processor to receive, from a mobile device executing a mobile device application, a first type of data printed on a ticket voucher. When executed by the processor, the instructions cause the processor to, independent of the receipt of the first type of data printed on the ticket voucher, receive, from the mobile device executing the mobile device application, a second, different type of data printed on the ticket voucher. When executed by the processor responsive to the received first type of data printed on the ticket voucher being associated with the ticket voucher and the second, different type of data printed on the ticket voucher being associated with the ticket voucher, the instructions cause the processor to cause an amount of funds associated with the ticket voucher to be available in association with a non-cash form of payment.

In certain embodiments, the present disclosure relates to a method of operating a system including receiving, from a mobile device executing a mobile device application, a validation number associated with a ticket voucher. Independent of the receipt of the validation number associated with the ticket voucher, the method includes receiving, from the mobile device executing the mobile device application, authentication data. Responsive to the received authentication data being associated with the ticket voucher associated with the received validation number, the method includes causing, by a processor, an amount of funds associated with the ticket voucher to be available in association with a non-cash form of payment.

Additional features are described herein, and will be apparent from the following Detailed Description and the figures.

DETAILED DESCRIPTION

Figure 1A:
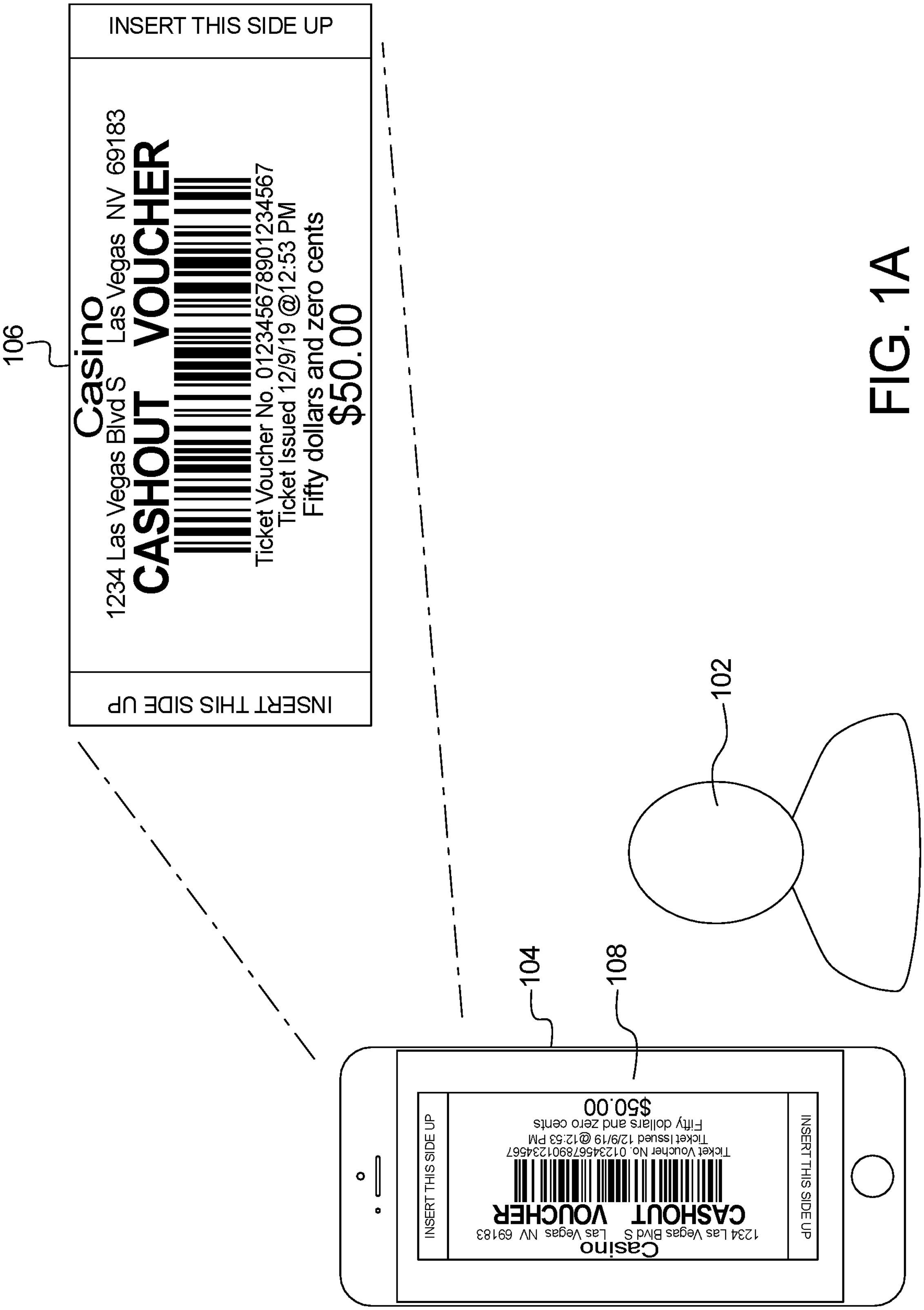
FIGS. 1A, and 1B are example graphical user interfaces of one embodiment of the present disclosure displayed by a mobile device application of a mobile device in connection with redeeming a ticket voucher in association with a non-cash form of payment.

In various embodiments, following a user procuring a ticket voucher (e.g., an anonymous bearer instrument associated with an amount of funds and redeemable for cash via a kiosk, a cashier and/or game play on a gaming establishment device, such as an electronic gaming machine ("EGM")), the system enables the user to utilize different sets of ticket voucher data received via a mobile device to redeem the ticket voucher independent of any kiosk or gaming establishment device. In these embodiments, upon a mobile device application receiving both identification information associated with a ticket voucher to be redeemed and authentication information associated with the ticket voucher, the mobile device operates with a mobile device ticket voucher redemption system (which operates with a ticket voucher system and a fund management system) to cause a non-cash form of the amount of funds associated with the ticket voucher to become available to the holder of the ticket voucher. That is, rather than redeeming a ticket voucher at an EGM, a kiosk or a gaming establishment interface, such as a cashier at a casino desk, for an amount of cash equal to an amount of funds associated with the redeemed ticket voucher, the system enables a user to redeem a ticket voucher for the amount of funds responsive to various identifiers associated with the ticket voucher being captured by a mobile device running an application associated with the gaming system.

It should be appreciated that in addition to potentially providing a relatively more secure environment for a user (via reducing or eliminating a user carrying cash on their person after redeeming a ticket voucher and thus diminishing the risks that such cash may be lost or stolen), the system of the present disclosure also benefits the gaming establishment by freeing the gaming establishment up from having to maintain relatively large amounts of cash in such cash dispensing kiosks. Additionally, by reducing the use of such cash dispensing kiosks, the system reduces the wear and tear on such devices thus prolonging the operational life on these devices.

Moreover, by reducing the amount of cash transactions in a gaming establishment via utilizing a mobile device to redeem ticket vouchers, the system of the present disclosure reduces or eliminates human errors which often occur when ticket vouchers are redeemed at gaming establishment interfaces, such as casino desks. Specifically, eliminating gaming establishment personnel from issuing amounts of cash in exchange for redeemed ticket vouchers not only protects the user (if the gaming establishment personnel provides the gaming establishment patron less cash than the patron deserves) but also protects the gaming establishment (if the gaming establishment personnel inadvertently or fraudulently provides the patron more cash than the patron deserves).

Furthermore, the system of the present disclosure provides a plurality of alternative, non-cash-based options for a gaming establishment patron to redeem a ticket voucher using a mobile device while complying with various anti-money laundering regulations which require the tracking of certain financial transactions associated with a gaming establishment patron. As such, to further expand the cashless ecosystem certain gaming establishments strive for, the system of the present disclosure enables a patron the opportunity to redeem a ticket voucher for an amount of funds that are independent of any amount of cash and relatively more secure than an amount of cash.

Redeeming Ticket Vouchers

In various embodiments, following a user obtaining one or more ticket vouchers, such as upon a user of an EGM cashing out a credit balance in exchange for a ticket voucher associated with an amount of funds of the cashed out credit balance, the system enables a user to utilize a mobile device application to redeem such ticket vouchers in exchange for a non-cash form of payment.

In certain embodiments, each ticket voucher includes or is otherwise associated with different identifying information which is identifiable to a holder of the ticket voucher, such as a ticket voucher validation number, and an amount of funds associated with the ticket voucher. More specifically, each ticket voucher includes various fields of identifying information including, but not limited to: (i) a gaming establishment name; (ii) a gaming establishment address; (iii) a ticket voucher title (e.g., "cashout ticket" or "cashout voucher"); (iv) a ticket voucher validation number (e.g., an eighteen digit number or code of the issued ticket voucher printed on the ticket voucher); (v) a ticket voucher validation number bar code (i.e., a bar code that contains an encoded ticket voucher validation number; (vi) a ticket date/time (i.e., a date/time when the ticket voucher was issued); (vii) a ticket number (i.e., a sequential number printed on the ticket voucher by an EGM); (viii) an amount (i.e., an amount of the ticket voucher as a numerical value with a currency sign); (ix) an amount in words (i.e., the amount of the issued ticket voucher in words); (x) an expiration (i.e., an expiration date of the ticket voucher (if the ticket is a promotion or noncashable ticket)); and/or (xi) a machine identification (i.e., an asset or machine number of the device that printed the ticket voucher).

In certain embodiments wherein the ticket voucher takes the form of a paper ticket voucher, the user utilizes a mobile device application being run on a mobile device to scan the paper ticket voucher such that the mobile device application reads the ticket voucher validation number encoded in the barcode. In other embodiments wherein the ticket voucher takes the form of a paper ticket voucher, the user utilizes an interface of a mobile device application being run on a mobile device to input the ticket voucher validation number. In other embodiments wherein the ticket voucher takes the form of a virtual ticket voucher, following the user selecting, via an interface of the mobile device application, a virtual ticket voucher to redeem, the mobile device application determines a ticket voucher validation number of the selected virtual ticket voucher.

Figure 1B:
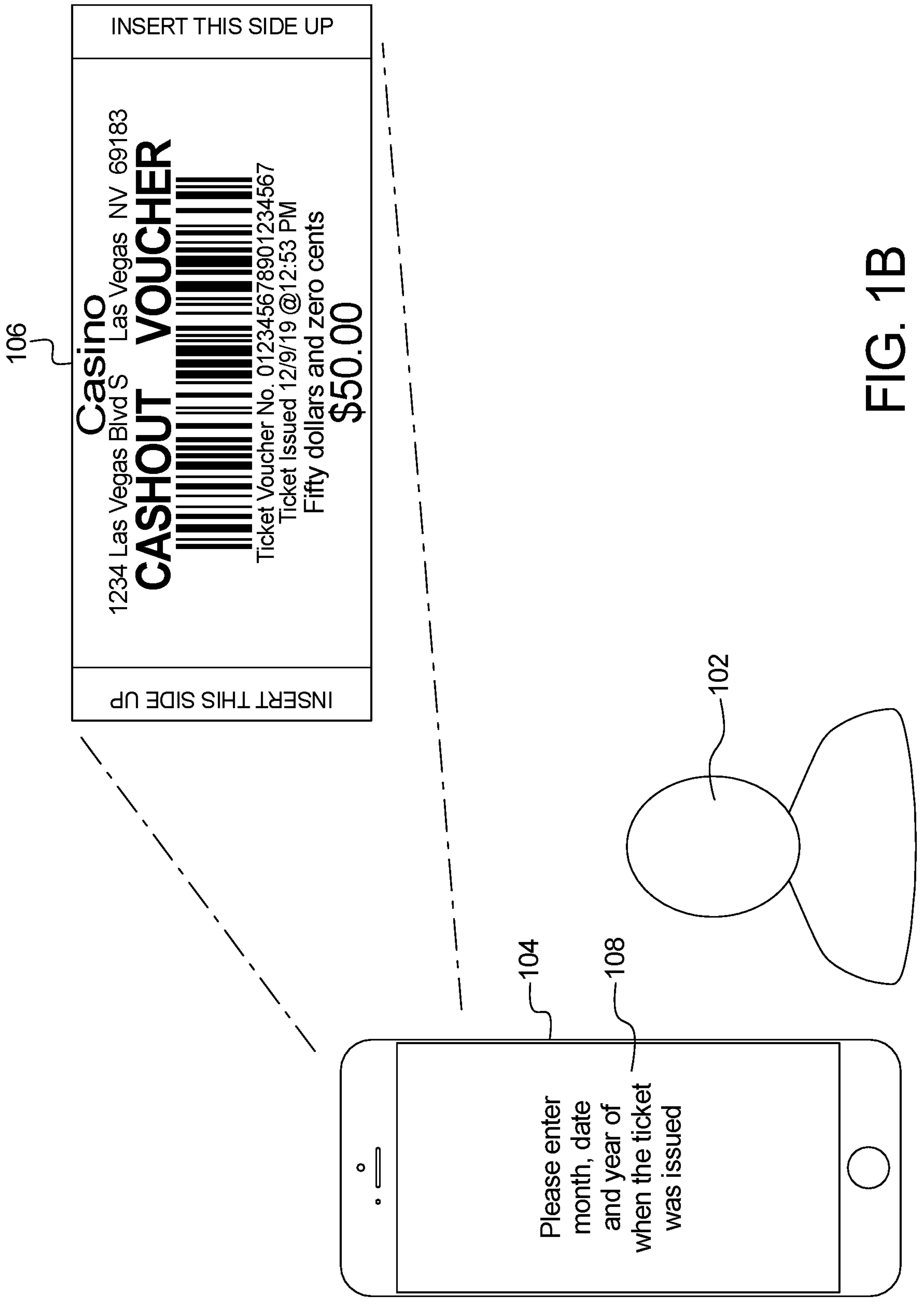

In these embodiments, in addition to identifying the ticket voucher utilizing the ticket voucher validation number (i.e., a first type of data printed on or otherwise associated with the ticket voucher), the user utilizes the mobile device application to capture, via scanning or manually entering, additional information, such as information printed on or otherwise associated with the ticket voucher in one or more of the above-identified fields, to verify that the user is in possession of the ticket voucher. That is, as an extra security measure in the redemption of a ticket voucher utilizing a mobile device application, the system of the present disclosure employs both identification information associated with a ticket voucher to be redeemed and additional authentication information associated with the ticket voucher to be redeemed. For example, as seen in FIGS. 1A and 1B, after a user 102 utilizes the camera of a mobile device 104 to scan the barcode of a ticket voucher 106 to obtain the ticket voucher validation number of the ticket voucher (see FIG. 1A), the mobile device application 108 prompts the user to key in the month, date and year of when the ticket voucher was issued (see FIG. 1B), wherein this month, date and year information qualifies as the additional information required to prove that the attempted ticket voucher redemption is being requested by the holder of the ticket voucher (and not a non-holder of the ticket voucher attempting to fraudulently redeem a ticket voucher).

It should be appreciated that in certain embodiments, the mobile device application utilized to redeem one or more ticket vouchers includes a location based digital wallet enabled application, such as a Passbook-enabled or Wallet-enabled application, which is accessible when the player enters a gaming establishment. In certain other embodiments, the mobile device application utilized to redeem one or more ticket vouchers are downloaded to the mobile device from an application store. In certain of such embodiments, the mobile device application is downloaded to the mobile device from one or more websites affiliated with the gaming establishment (which are accessible directly by the user and/or by a link opened when the user scans a QR code).

It should be further appreciated that the employment of the additional information significantly reduces the risk that a non-holder of the ticket voucher may redeem a ticket voucher using only a manufactured ticket voucher validation number. That is, since certain ticket voucher validation numbers are an eighteen digit number or code, there are a finite set of 1,000,000,000,000,000,000 (i.e., 10^18) possible ticket voucher validation numbers or codes available and thus someone may attempt a brute force attack on the ticketing system by trying every combination of ticket voucher validation number or codes. To combat such a potential brute force attack, the system of the present disclosure utilizes the additional information required in the mobile device redemption of a ticket voucher to significantly increase the data required to redeem a ticket voucher and effectively make a brute force attack unlikely to be successful in anyone's lifetime. Specifically, the length and potential values of the additional information required for the redemption of a ticket voucher via a mobile device application has a multiplying effect on the size of the finite set of possible ticket voucher validation numbers or codes. For example, if the holder of a ticket voucher entered an eighteen digit code plus the three-digit face value of the ticket voucher of $0.01, the finite set could increase by a multiple of 1000 (i.e., 10×10×10) because each possible value of the extra data can be ten different digits (i.e., 0-9).

Additionally, any suitable information or data from any additional field of the ticket voucher may be employed as the additional information to increase the security of a mobile device facilitated redemption of a ticket voucher. In certain embodiments, the additional information includes information from one of the fields of identifying information. In certain other embodiments, the additional information includes information from a plurality of the fields of identifying information. In certain embodiments, the additional information includes part of, but not all of, the information from one of the fields of identifying information. In certain other embodiments, the additional information includes partial information from each of a plurality of the fields of identifying information. In these embodiments, the more additional information required to redeem a ticket voucher via a mobile device application, the more possible combinations available which must be tried in a brute force attack and thus the more secure the redemption of the ticket voucher.

In certain embodiments, the one or more fields of identifying information the system utilizes as the additional information required to redeem a ticket voucher via a mobile device application remain static. In these embodiments, data from the same fields of identifying information are used each time a ticket voucher is redeemed using the mobile device application. In certain other embodiments, the one or more fields of identifying information the system utilizes as the additional information required to redeem a ticket voucher via a mobile device application dynamically change. In these embodiments, data from different fields of identifying information are used for different times a ticket voucher is redeemed using the mobile device application such that during the ticket voucher validation process, the user is queried for extra data that the ticket voucher holder could not predict. For example, upon launching a mobile device application to redeem a ticket voucher, the mobile device application interacts with a ticketing system which instructs the mobile device application which field of identifying information to collect from the ticket voucher holder as the additional information.

In certain embodiments, in addition to the data of one or more of the fields of identifying information printed on otherwise associated with a ticket voucher, the ticket voucher includes one or more additional customizable fields of information used for the redemption of ticket vouchers via the mobile device application. In these embodiments, the ticket voucher's customizable fields could be incorporated into the mobile device ticket voucher redemption process wherein different data is included in the different fields during different periods of time. For example, a digit could be added to the end of the gaming establishment name daily, weekly, or monthly wherein this additional digit forms part or all of the additional information required to redeem a ticket voucher via a mobile device application. In another example, one or more periodically changing non-numeric data, such as images or names, could also be added to the text field, wherein these additional non-numeric data form part or all of the additional information required to redeem a ticket voucher via a mobile device application.

Figure 2:
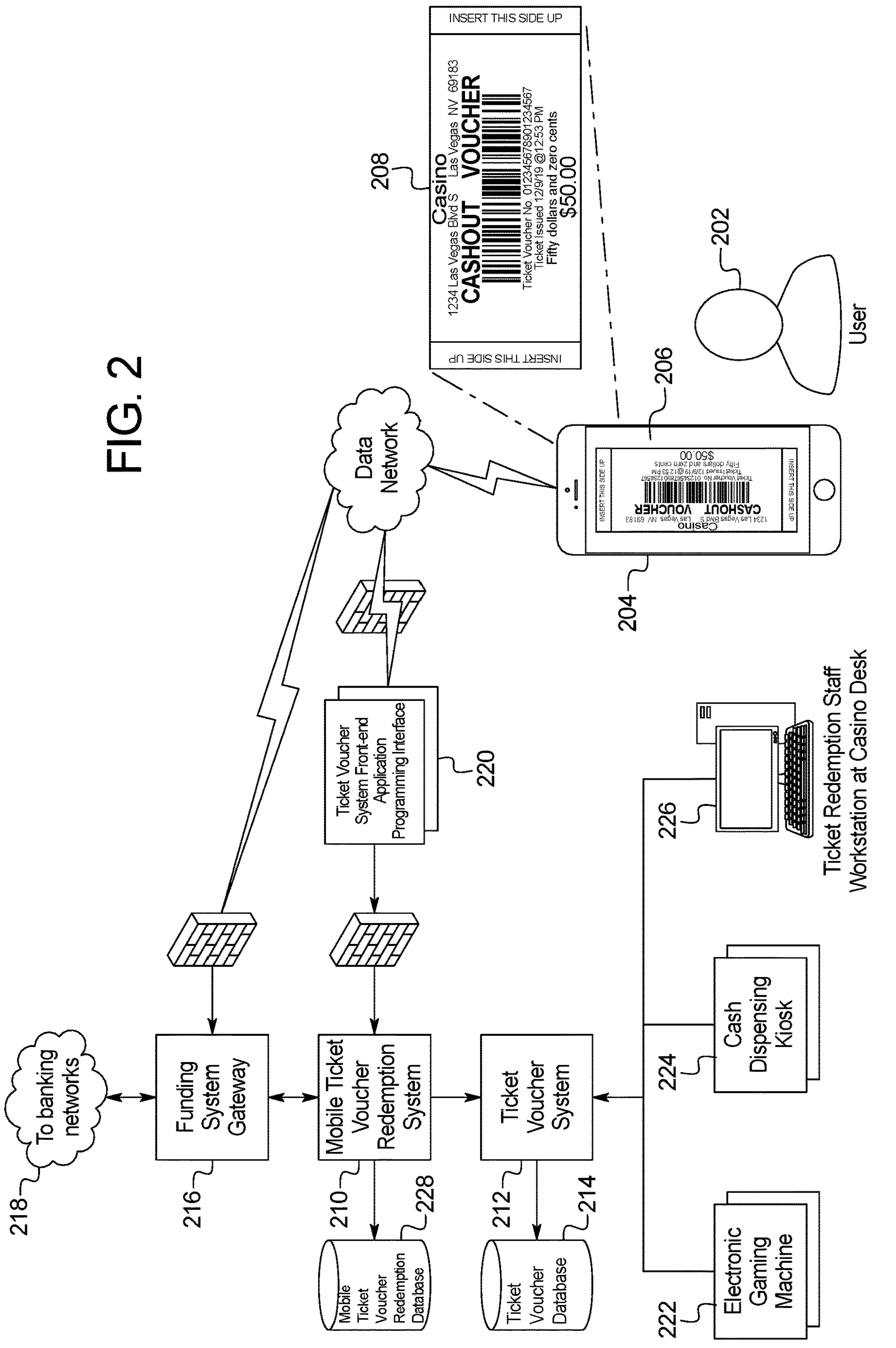
FIG. 2 is an example configuration of the architecture of a plurality of different components of the system of one embodiment of the present disclosure which enable a ticket voucher to be redeemed via a mobile device.

In various embodiments, following the user of the mobile device providing the ticket voucher validation number (or other ticket voucher identifying information) and the additional information to the mobile device application, the mobile device communicates the ticket voucher validation number and the additional information to a component of a mobile ticket voucher redemption system. The component of the mobile ticket voucher redemption system then determines if the additional information provided to the mobile device application corresponds with the ticket voucher validation number provided to the mobile device application. For example, as seen in FIG. 2, upon a user 202 utilizing a mobile device 204 to capture, by a mobile device application 206, multiple sets of ticket voucher information, such as a ticket voucher validation number and additional information, in an attempt to verify possession of a ticket voucher 208, the mobile device operates with a component of the mobile ticket voucher redemption system 210 to determine if the additional information provided to the mobile device application corresponds with the ticket voucher validation number provided to the mobile device application. Such an example illustrates that prior to redeeming a ticket voucher via a mobile device application, the system employs one or more enhanced security measures to first verify that the attempted redemption is an authentic redemption by a holder of the ticket voucher.

If the component of the mobile ticket voucher redemption system determines that the additional information provided to the mobile device application does not correspond with the ticket voucher validation number provided to the mobile device application, the component of the mobile ticket voucher redemption system rejects the attempted mobile device facilitated redemption of a ticket voucher. In certain embodiments, if the component of the mobile ticket voucher redemption system determines to reject the attempted redemption of the ticket voucher utilizing the mobile device, the component of the mobile ticket voucher redemption system communicates a denial to the mobile device and ceases the attempted ticket voucher redemption. In certain embodiments, the component of the mobile ticket voucher redemption system conveys one or more messages to the user regarding the denial of the ticket voucher redemption, such as via the mobile device used to attempt to redeem the ticket voucher.

On the other hand, if the component of the mobile ticket voucher redemption system determines that the additional information provided to the mobile device application corresponds with the ticket voucher validation number provided to the mobile device application, the component of the mobile ticket voucher redemption system then operates with a ticket voucher system to determine whether to authorize the redemption of the ticket voucher by verifying that the ticket voucher is a valid ticket voucher which is authentic and has not been previously redeemed and/or voided by the ticket voucher system. In other words, the system determines, following the employment of the ticket voucher validation number and the additional information provided to the mobile device application as an additional security measure, whether the ticket voucher is a valid ticket voucher which is authentic and has not been previously redeemed and/or voided by the ticket voucher system. Continuing with the above example of FIG. 2, if the component of the mobile ticket voucher redemption system determines that the additional information provided to the mobile device application corresponds with the ticket voucher validation number provided to the mobile device application, the component of the mobile ticket voucher redemption system operates with a ticket voucher system 212 to determine whether the ticket voucher is an authentic ticket voucher currently associated with the amount of funds indicated by the presented ticket voucher.

In certain embodiments, if the ticket voucher system determines not to authorize the redemption of the ticket voucher because the ticket voucher is inauthentic or otherwise invalid, such as being previously redeemed or voided by the ticket voucher system, the ticker voucher system communicates a denial to the component of the mobile ticket voucher redemption system and does not complete the ticket voucher redemption. In certain embodiments, the component of the mobile ticket voucher redemption system then conveys one or more messages to the user regarding the denial of the ticket voucher redemption, such as via the mobile device used to attempt to redeem the ticket voucher.

On the other hand, if the ticket voucher system determines to authorize the redemption of the ticket voucher because the ticket voucher is valid and authentic, the ticket voucher system updates one or more databases regarding the redemption of such a ticket voucher. For example, as seen in FIG. 2, the ticket voucher system includes a ticket voucher database 214 which stores various fields of data utilizing by the ticket voucher system to track issued ticket vouchers. In different embodiments, the database fields of the ticket voucher database which the ticket voucher system may utilize to approve a redemption of a ticket voucher include, but are not limited to: (i) a primary key (i.e., an index for the record in the table); (ii) a ticket voucher validation number (i.e., the validation number associated with the issued ticket); (iii) a ticket state (e.g., a state of a ticket as being in an issued state or a redeemed state); (iv) an issuance date (i.e., the date when the ticket voucher was issued); (v) a property address associated with the ticket voucher issuance; (vi) an amount of funds associated with the ticket voucher; (vii) any expiration date associated with the ticket voucher; (viii) a device identification associated with the issuance of the ticket voucher; (ix) an image of the ticket voucher (e.g., an image of a front of the ticket voucher and/or an image of a back of the ticket voucher); (x) a redemption date (i.e., the date the ticket voucher was redeemed at (if the ticket voucher is in the redeemed state; (xi) redeemed at (i.e., the device where the ticket voucher was redeemed (if the ticket voucher is in the redeemed state)); (xii) a data signature (i.e., a signature of the data associated with the ticket voucher to prevent tampering by casino employees).

In addition to updating one or more ticket voucher databases to reflect the successful redemption of the ticket voucher, the ticket voucher system notifies the component of the mobile ticket voucher redemption system which operates with a component of a funding system to cause a non-cash form of payment to be generated for the amount of the redeemed ticket voucher. In certain embodiments, the component of the funding system conveys one or more messages to the user regarding the non-cash form of payment for the redeemed ticket voucher, such as via the mobile device used to attempt to redeem the ticket voucher. Continuing with the above example of FIG. 2, following the ticket voucher system authorizing the mobile device facilitated redemption of the ticket voucher, the ticket voucher system operates with the component of the mobile ticket voucher redemption system which operates with the component of the funding system gateway 216 to provide a non-cash form of payment for the mobile device redeemed ticket voucher.

In certain embodiments, the non-cash form of payment that the system utilizes in association with a mobile device facilitated redemption of a ticket voucher includes a transfer to an external funding source which maintains one or more external accounts. For example, as seen in FIG. 2, the component of the funding system gateway 216 is in communication with a network of one or more banks or other financial institutions (i.e., the banking networks 218) to cause an electronic transfer of funds associated with the redeemed ticket voucher to the user's accounts maintained at such banks or financial institutions. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the component of the funding system being in communication with one or more external funding sources, in different embodiments, any component or sub-system described herein can be in communication with one or more external funding sources.

In certain embodiments wherein the non-cash form of payment includes a transfer to an external funding sources which maintain one or more external accounts, the system disclosed herein enables the mobile device application to communicate directly with the component of the funding system such that details of the account which the funds represented by the ticket voucher are to be transferred bypass the component of the mobile ticket voucher redemption system. Such a configuration provides that the component of the mobile ticket voucher redemption system does not need to comply with various banking security standards, such as the processing card industry standards, because only the component of the funding system is aware of the destination account details while the component of the mobile ticket voucher redemption system is unaware of or otherwise immune to those details. In these embodiments, the holder of the ticket voucher interfaces with the mobile device application to enter the details of the account they wish to transfer the funds represented by the ticket voucher to, wherein the entered information is represented by a token that is passed back to the mobile application. This token (which points to banking information in the banking network) is then leveraged by the component of the mobile ticket voucher redemption system to trigger the transfer to the holder's selected account after the ticket voucher has been successfully redeemed.

Figure 3:
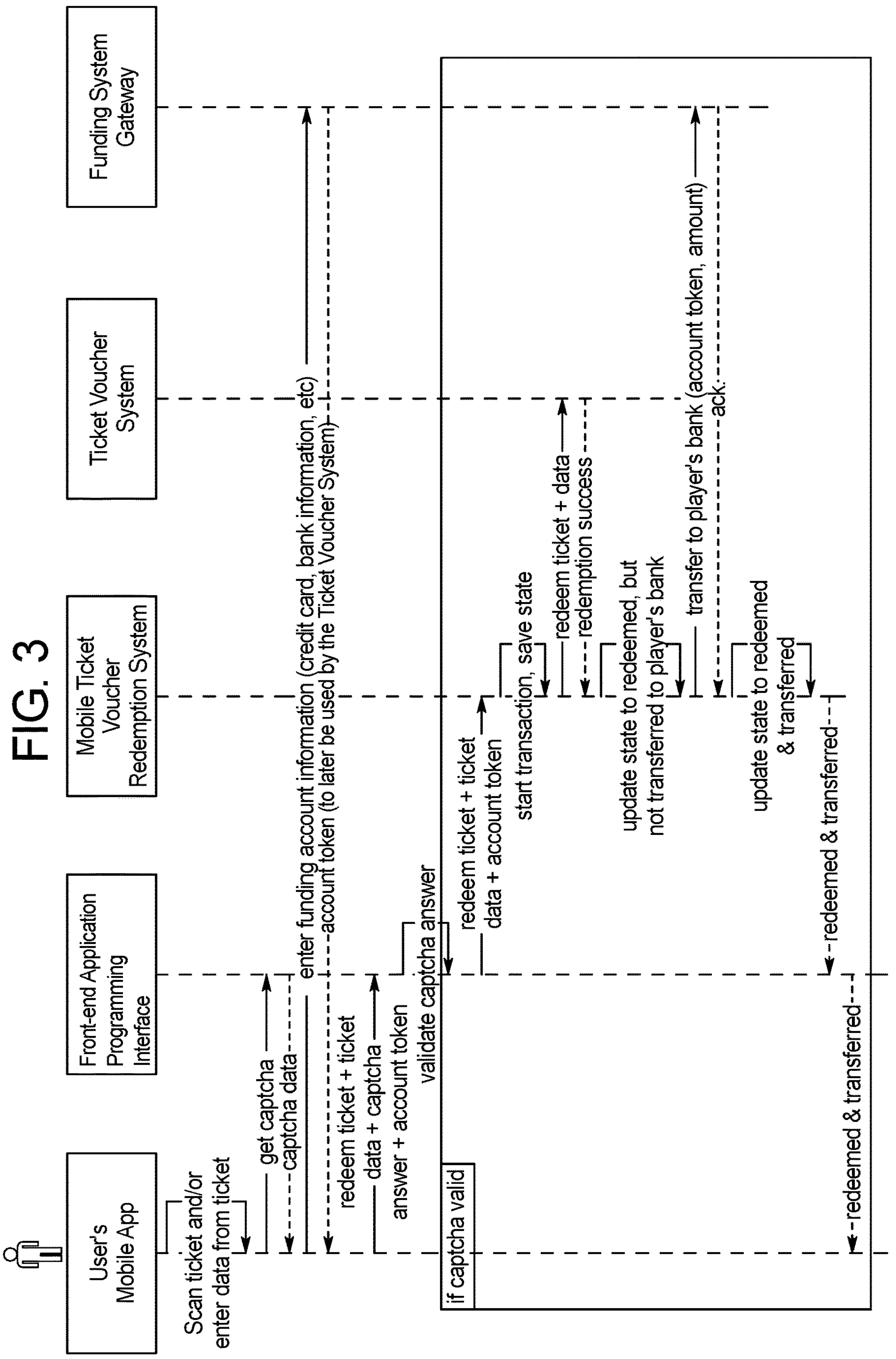
FIG. 3 is a schematic diagram of the interactions between a mobile device, a mobile device ticket voucher redemption system, a ticket voucher system and a fund management system in association with utilizing a mobile device to redeem a ticket voucher of one embodiment of the present disclosure.

More specifically, as illustrated in FIG. 3, following the mobile device capturing data from multiple fields of a ticket voucher to be redeemed, the user interfaces with the mobile device application to enter funding account information, such as banking information. The mobile device application then interfaces with a component of the funding system to obtain a token associated with the funding account information.

As further illustrated in FIG. 3, following, as described below, the user of the mobile device application validating that they are a human via identifying one or more images, the mobile device application communicates ticket voucher redemption data, such as the data captured from multiple fields of the ticket voucher, and the token associated with the funding account information to a ticket voucher system front-end application program interface which communicates such data to a component of the mobile ticket voucher redemption system. In this example, the component of the mobile ticket voucher redemption system verifies that the data captured from multiple fields of the ticket voucher corresponds with the ticket voucher to be redeemed. Upon verifying that the data captured from multiple fields of the ticket voucher corresponds with the ticket voucher to be redeemed, the component of the mobile ticket voucher redemption system operates with the ticket voucher system to verify that the ticket voucher to be redeemed is an authentic ticket voucher available for redemption. Following a confirmation of this verification from the ticket voucher system and the ticket voucher system updating a status of the ticket voucher in one or more databases, the component of the mobile ticket voucher redemption system operates with the component of the funding system to provide the component of the funding system with the token associated with the funding account information and an amount of the ticket voucher being redeemed. In this example, after the component of the funding system acknowledges the amount of the ticket voucher to be transferred from an account associated with the ticket voucher system to the account identified by the token, the component of the mobile ticket voucher redemption system updates the status of the redeemed ticket voucher to account for this transfer and then operates with the ticket voucher system front-end application program interface to cause the mobile device application to communicate one or more messages that the ticket voucher has been redeemed and the amount of funds associated with the ticket voucher have been deposited in the account identified by the user of the mobile device.

In certain embodiments, the non-cash form of payment that the system utilizes in association with a mobile device facilitated redemption of a ticket voucher includes a transfer to a gaming establishment account of a gaming establishment fund management system. In these embodiments, a gaming establishment fund management system includes various components or sub-systems that are each associated with or otherwise maintain one or more electronic or virtual accounts wherein the various gaming establishment accounts maintained for a user collectively form a resort or enterprise account (e.g., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a player and/or retail patron, collectively form a resort or enterprise account (i.e., an integrated resort or gaming establishment fund management wallet) that the user may access to transfer funds and/or view balance information amongst the various accounts associated with or otherwise maintained for the user. In these embodiments, following the verification that the data captured from multiple fields of the ticket voucher corresponds with the ticket voucher to be redeemed and also the verification that the ticket voucher to be redeemed is an authentic ticket voucher available for redemption, the ticket voucher system operates with one or more components of the gaming establishment fund management system to transfer the amount of the ticket voucher from an account associated with the ticket voucher system to the gaming establishment account identified by the user of the mobile device as the destination of the funds of the redeemed ticket voucher.

In certain embodiments, the non-cash form of payment that the system utilizes in association with the mobile device facilitated redemption of ticket vouchers includes virtual or electronic pre-paid cards, such as a pre-paid debit card associated with a balance or a card associated with a pre-paid access account. In these embodiments, following the verification that the data captured from multiple fields of the ticket voucher corresponds with the ticket voucher to be redeemed and also the verification that the ticket voucher to be redeemed is an authentic ticket voucher available for redemption, the ticket voucher system operates with one or more components of the mobile ticket voucher redemption system to transfer the amount of the ticket voucher from an account associated with the ticket voucher system to a virtual or electronic pre-paid card. In certain embodiments, the non-cash form of payment includes a pre-paid debit card which can be used in association with a financial network, such as a credit card network, to enable the cardholder to spend money which has been associated with the pre-paid debit card via a prior deposit of funds in association with the redemption of a ticket voucher. In certain such embodiments, the pre-paid debit card is a reloadable debit card wherein the user or another entity may add additional funds to the pre-paid debit card. In other such embodiments, the pre-paid debit card is a non-reloadable debit card wherein neither the user or another entity may add any additional funds to the pre-paid debit card. In certain such embodiments, the amounts of funds associated with a pre-paid debit card may be utilized to purchase goods and/or services, but may not be convertible for cash. In other such embodiments, the amounts of funds associated with a pre-paid debit card may be utilized to purchase goods and/or services and also convertible for cash, such as via an automated teller machine. In this embodiment, to comply with certain anti-money laundering regulations, prior to enabling a user to convert an amount of funds associated with a redeemed ticket voucher to a pre-paid debit card usable at an automated teller machine, an identity of the user must be obtained.

In certain embodiments, the non-cash form of payment that the system utilizes in association with the mobile device facilitated redemption of ticket vouchers additionally or alternatively includes a pre-paid gift card which is associated with one or more merchants. In these embodiments, following the verification that the data captured from multiple fields of the ticket voucher corresponds with the ticket voucher to be redeemed and also the verification that the ticket voucher to be redeemed is an authentic ticket voucher available for redemption, the ticket voucher system operates with one or more components of the mobile ticket voucher redemption system to transfer the amount of the ticket voucher from an account associated with the ticket voucher system to a pre-paid gift card. It should be appreciated that, per current U.S. Treasury Department regulations, the funds associated with such a pre-paid gift card, such as a pre-paid merchant card, may not be convertible for cash, but may be used to pay for various purchases of goods and/or services at the associated merchant. In certain embodiments, the pre-paid gift card is reloadable wherein the user or another entity may add additional funds to the pre-paid gift card. In other embodiments, the pre-paid gift card is not reloadable wherein neither the user or another entity may add any additional funds to the pre-paid gift card.

In certain embodiments, the pre-paid debit card and/or the pre-paid gift card that the system utilizes in association with the mobile device facilitated redemption of ticket vouchers include virtual cards, wherein a user is provided login information to access a website which displays the electronic pre-paid debit card number and/or the electronic pre-paid gift card number. In certain embodiments, the pre-paid debit card and/or the pre-paid gift card that the system utilizes in association with the mobile device facilitated redemption of ticket vouchers include virtual cards, wherein a user accesses the pre-paid debit card and/or the pre-paid gift card via an electronic wallet, such as an electronic wallet associated with a mobile device, which then stores information regarding the pre-paid debit card and/or the pre-paid gift card.

In certain embodiments, the non-cash form of payment that the system utilizes in association with the mobile device facilitated redemption of ticket vouchers additionally or alternatively includes an original credit transaction wherein an amount of funds associated with the redeemed ticket voucher are credited to an account of the user, such as a credit card account or a debit card account. That is, unlike a refund transaction which enables a merchant to return an amount of funds previously withdrawn from a credit card account and/or a debit card account of a user back to the account of the user which the funds were initially drawn from, an original credit transaction enables the transfer of an amount of funds to a credit card account of the user and/or a debit card account of the user regardless of any original transaction. Put differently, an original credit transaction enables an amount of funds to be transferred directly to a credit card account and/or a debit card account independent of any prior transaction which charged an amount of funds from that account. In these embodiments, following the verification that the data captured from multiple fields of the ticket voucher corresponds with the ticket voucher to be redeemed and also the verification that the ticket voucher to be redeemed is an authentic ticket voucher available for redemption, the ticket voucher system operates with one or more components of the mobile ticket voucher redemption system to transfer the amount of the ticket voucher from an account associated with the ticket voucher system to create an original credit transaction of an account of the user.

In certain embodiments, the non-cash form of payment includes an electronic check made out to the user which is electronically presentable at a financial institution for the amount of funds associated with the redeemed ticket voucher. In these embodiments, following the verification that the data captured from multiple fields of the ticket voucher corresponds with the ticket voucher to be redeemed and also the verification that the ticket voucher to be redeemed is an authentic ticket voucher available for redemption, the ticket voucher system operates with one or more components of the mobile ticket voucher redemption system to transfer the amount of the ticket voucher from an account associated with the ticket voucher system to an electronic check. Specifically, to issue a check of such an embodiment, the system initiates a fund transfer wherein an amount of funds corresponding to part or all of the amount of the redeemed ticket voucher is transferred from a gaming establishment account which holds the funds associated with the ticket voucher system, such as a banking account associated with the gaming establishment, to a checking account of a financial institution which issues such checks, such as a checking account associated with a bank that issues the checks associated with redeemed ticket vouchers. In certain other embodiments, the gaming establishment account which holds the funds associated with the ticket voucher system, such as a banking account associated with the gaming establishment, also functions as a checking account associated with check writing features to issue the checks associated with redeemed ticket vouchers.

It should thus be appreciated that the utilization of a mobile device application to redeem, in a relatively more secure manner, one or more ticket vouchers of the present disclosure not only provides a relatively more secure environment for a user (via reducing or eliminating the need for the user to carry cash on their person after redeeming a ticket voucher, thus diminishing the risks that such cash may be lost or stolen), but also benefits the gaming establishment by freeing the gaming establishment up from also having to carry relatively large amounts of cash in cash dispensing kiosks (and thus reduces the use of such cash dispensing kiosks, the system reduces the wear and tear on such devices thus prolonging the operational life on these devices). Such a configuration of utilizing a mobile device to redeem ticket vouchers of the present disclosure further reduces the amount of cash transactions in a gaming establishment which reduces or eliminates human errors which often occur when ticket vouchers are redeemed at gaming establishment interfaces to not only protect the user (if the gaming establishment personnel provides the gaming establishment patron less cash than the patron deserves) but also protect the gaming establishment (if the gaming establishment personnel inadvertently or fraudulently provides the patron more cash than the patron deserves).

In certain embodiments, as mentioned above, prior to enabling a user to utilize a mobile device application to redeem to ticket voucher, the system requires the user of the mobile device application to validate that they are a human (and not a computer attempting a brute force attack to electronically redeem a ticket voucher). In one such embodiment, an application programming interface of the ticket voucher system implements one or more methods to validate that a human is running the mobile application. For example, as indicated in FIGS. 2 and 3, the user of the mobile application interface with a ticket voucher system front-end application programming interface ("API") 220 which requires the user to validate a Completely Automated Public Turing test to tell Computers and Humans Apart ("CAPTCHA") image prior to initiating the mobile device application ticket voucher redemption request.

In certain embodiments, to prevent a client device, such as a mobile device, from making too many ticket voucher redemption requests, the system tracks requests to redeem ticket vouchers by client devices such as by utilizing a web facing application programming interface to track ticket voucher redemption requests by IP address. In these embodiments, if the system determines that more than a threshold quantity of rejected or denied ticket voucher redemption requests have come from the same client device, the system prevents additional ticket voucher redemption requests from that client device until an elapsed amount of time, the client device has validated their identity by enrolling with the system, the client device solves a puzzle that computers cannot relatively easily solve, such as validating a CAPTCHA image and/or the client device is located within a gaming establishment (via determining that the client device is connected to a gaming establishment WiFi network and/or utilizing suitable geolocation technologies, such as via utilizing one or more beacons and/or a global position system module of the client device).

In certain embodiments, in addition to or alternative from preventing a client device from making too many ticket voucher redemption requests, the system tracks requests to redeem an individual ticket voucher over a period of time. In these embodiments, if the system, such as a front-end application program interface or the ticket voucher system, determines that more than a threshold quantity of rejected or denied ticket voucher redemption requests have been received in association with the same ticket voucher, the system prevents additional mobile device facilitated ticket voucher redemption requests in association with that ticket voucher. In one such embodiment, following a designated period of time, the system again enables mobile device facilitated ticket voucher redemption requests in association with that ticket voucher. In another such embodiment, the system prohibits mobile device facilitated ticket voucher redemption requests in association with that ticket voucher and rather requires the holder of that ticket voucher to redeem the ticket voucher at, as seen in FIG. 2, an electronic gaming machine 222, a cash dispensing ticket voucher redemption kiosk 224, or a gaming establishment interface, such as a casino desk 226.

It should be appreciated that ticket vouchers are anonymous funding instruments and gaming establishments are responsible for implementing various anti-money laundering controls, such as limiting the maximum value of a ticket voucher that can be redeemed through a certain interface, to ensure that players are not laundering funds through the gaming establishment. For example, certain anti-money laundering controls provide that ticket vouchers worth $1000 or less may be redeemed at a ticket voucher redemption kiosk, while ticket vouchers worth more than $1000 must be redeemed at a gaming establishment interface, such as a casino desk, where gaming establishment personnel can look at the player, track their physical description, and possibly file any government mandated reports (e.g., a Suspicious Activity Report) if a player redeems too many high value ticket vouchers within a period of time. Accordingly, in view of various anti-money laundering regulations, the system imposes certain limits on the amount of funds which can be converted to non-cash forms of payment utilizing a mobile device application over a designated period of time, such as over a day, a week or a month.

In certain embodiments, the component of the mobile ticket voucher redemption system maintains a database including "fingerprint" data of the player's mobile device (e.g., information pertaining the IP address of the player's mobile device, the operating system, and/or the phone version) wherein the component of the mobile ticket voucher redemption system tracks historical mobile device facilitated ticket voucher redemptions to determine whether a requested ticket voucher redemption using a mobile device application violates any anti-money laundering limits. For example, as seen in FIG. 2, the mobile ticket voucher redemption system operates with a mobile ticket voucher redemption database 228 which stores various fields of data utilizing by the mobile ticket voucher redemption system to track mobile device attempted redemptions of issued ticket vouchers. In different embodiments, the database fields of the mobile ticket voucher redemption database which the mobile ticket voucher redemption system may utilize to screen mobile device attempted redemptions of ticket vouchers include, but are not limited to: (i) a primary key (i.e., an index for the record in the table); (ii) a ticket voucher validation number (i.e., the validation number associated with the issued ticket); (iii) a ticket redemption state (e.g., a state of a ticket voucher being redeemed, such as start, validated but not transferred or transferred); (iv) a redemption attempts counter (i.e., the number of redemption attempts that have been attempted utilizing a device other than a designated electronic gaming machine, ticket voucher redemption kiosk or a gaming establishment workstation); (v) a funding system gateway token (i.e., user entered details of an account which points to banking information in the banking network); (vi) an amount of time which must elapse before the ticket voucher may be redeemed via a mobile device; and (vii) a redeeming device fingerprint (e.g., information pertaining the IP address of the player's mobile device, the operating system, and/or the phone version). It should be appreciated that while illustrated as the information regarding the attempted redemptions of a ticket voucher being stored by the mobile ticket voucher redemption database, such information may additionally or alternatively be stored by the ticket voucher database.

In certain other embodiments, the component of the mobile ticket voucher redemption system requires a user of a mobile device to provide identifying information to redeem a ticket voucher over a certain amount, wherein this identifying information is matched against the information associated with the player's destination account. In certain of these embodiments, to redeem a ticket voucher using a mobile device application, to redeem a ticket voucher exceeding a certain value using a mobile device application and/or to redeem a ticket voucher exceeding a certain value over a period of time using a mobile device application, the system requires the player to provide their player's club account information, PIN number, first name, last name, address, last four digits of their Social Security Number, driver's license number, a photo of their driver's license taken by their mobile device. In these embodiments, as indicated above, for each identified user, the component of the mobile ticket voucher redemption system maintains a database of ticket vouchers redeemed using a mobile device application for non-cash forms of payment such that the component of the mobile ticket voucher redemption system may determine, based on any limits imposed for that user, whether or not to authorize the conversion of a ticket voucher to a non-cash form of payment. That is, prior to communicating with a ticket voucher system to potentially authorize the redemption of a ticket voucher to a non-cash form of payment for an identified user, the component of the mobile ticket voucher redemption system determines if that user is below the limit imposed by the system on that user for the designated period of time. If the component of the mobile ticket voucher redemption system determines that the user has exceeded the limit imposed by the system on that user for the designated period of time, the component of the mobile ticket voucher redemption system prohibits the further mobile device application facilitated conversion of funds associated with ticket vouchers to non-cash forms of payment for the designated period of time. On the other hand, if the component of the mobile ticket voucher redemption system determines that the user is below the limit imposed by the system on that user for the designated period of time, the component of the mobile ticket voucher redemption system enables the system to proceed as described herein with the potential conversion of funds associated with ticket vouchers to non-cash forms of payment. It should be appreciated that such a database of which users redeemed which ticket vouchers for which non-cash forms of payment enables authorities in any future financial fraud investigations or anti-money laundering compliance related tasks.

In certain such embodiments, the system imposes different limits for different users based on whether or not that user is identified by the system. In these embodiments, over the same designated period of time, the system enables an unidentified user to redeem, using a mobile device application, one or more ticket vouchers associated with a first amount of funds for a non-cash form of payment and enables an identified user to redeem, using a mobile device application, one or more ticket vouchers associated with a second, different amount of funds for a non-cash form of payment. For example, the system enables an unregistered anonymous user to redeem one or more ticket vouchers having a total value of $1000 or less per day for non-cash forms of payment while the system enables a registered user to redeem one or more ticket vouchers having a total value of up to $3000 per day for non-cash forms of payment. It should be appreciated that for certain types of non-cash forms of payment, such as an original credit transaction in which the user enables the mobile device application of the mobile device to read data from the user's credit card or debit card, the mobile device application has already identified the user in association with that transaction such that the system may track the ticket voucher redemption activity of that identified user. It should be further appreciated that to prohibit an unidentified user from repeatedly redeeming ticket vouchers for non-cash forms of payment beyond the limits imposed by the system, in certain embodiments, the system utilizes one or more biometric indicators, such as a facial recognition technologies, to track an unregistered user (by biometric indicators and not by user identification information stored in a gaming establishment patron management system) for anti-money laundering compliance.

In certain other embodiments, the system imposes different limits for different users based on the identity of those users. In these embodiments, the system enables different identified users to redeem, using a mobile device application, one or more ticket vouchers associated with different amounts of funds for a non-cash form of payment over a designated period of time. For example, the system enables an identified user having a first player tracking status to redeem one or more ticket vouchers having a total value of $3000 or less per day for non-cash forms of payment while the system enables an identified user having a second, greater player tracking status to redeem one or more ticket vouchers having a total value of up to $10,000 per day for non-cash forms of payment.

As such, the system of the present disclosure provides alternative, non-cash-based options for a gaming establishment patron to redeem a ticket voucher using a mobile device while complying with various anti-money laundering regulations which require the tracking of certain financial transactions associated with a gaming establishment patron. As such, to further expand the cashless ecosystem certain gaming establishments strive for, the system of the present disclosure enables a patron the opportunity to redeem a ticket voucher for an amount of funds that are independent of any amount of cash and relatively more secure than an amount of cash.

In certain embodiments, to facilitate the conversion of a redeemed ticket voucher to a non-cash form of payment, the system imposes certain fees associated with such a conversion. Certain of these transaction fees are imposed by the financial institution which is issuing the pre-paid card or creating the original credit transaction. In one such embodiment, different financial institutions may impose different fees for different types of non-cash forms of payment (e.g., a conversion of a redeemed ticket voucher to a pre-paid debit card carries a 2% fee imposed on the amount of the ticket voucher while a conversion of a redeemed ticket voucher to a creation of an original credit transaction carries a 1% fee imposed on the amount of the ticket voucher). In another such embodiment, different financial institutions may additionally or alternatively impose different fees for different amounts of funds being transferred to these non-cash forms of payment (e.g., a conversion of a redeemed ticket voucher to a pre-paid debit card having a value of under $500 carries a 2% fee imposed on the amount of the ticket voucher while a conversion of a redeemed ticket voucher to a pre-paid debit card having a value of $500 and greater carries a 1% fee imposed on the amount of the ticket voucher).

In certain embodiments, the amount of such fees are taken from the amount of funds associated with the redeemed ticket voucher. In certain embodiments, the user separately pays such fees using playing tracking points, comps, currency, funds associated with one or more gaming establishment accounts maintained for the user, and/or promotional points. In certain embodiments, to encourage the use of this alternative form of ticket voucher redemption (and thus realize the various above-described benefits to the user and gaming establishment), the gaming establishment pays for such fees on the user's behalf. In these embodiments, the gaming establishment may pay the fees for certain users (e.g., identified users having a relatively high player tracking status) while not pay the fees for other users (e.g., unidentified users). In certain other embodiments, to facilitate the conversion of a redeemed ticket voucher to a non-cash form of payment, the system does not impose any fees associated with such a conversion. In certain other embodiments, to encourage the use of this alternative form of ticket voucher redemption (and thus realize the various above-described benefits to the user and gaming establishment), the gaming establishment enables a user to convert a first amount of funds associated with a redeemed ticket voucher to a non-cash form of payment associated with a second, greater amount of funds.

Obtaining Ticket Vouchers

In various embodiments, prior to a mobile device facilitated ticket voucher redemption for a non-cash amount of funds as described herein, an amount of funds must be converted to one or more ticket vouchers.

In certain embodiments, the system enables an amount of funds deposited in an EGM to be converted to one or more ticket vouchers. In one such embodiment, the system enables a user that has an amount of cash (or other forms of payment as disclosed herein) to utilize an EGM to convert the cash to one or more ticket vouchers via the user first depositing the amount of cash into the EGM and then subsequently cashing out (either pre or post any gaming activity) an amount of a credit balance of the EGM in exchange for a ticket voucher. In another such embodiment, the system enables a user that has one or more printed ticket vouchers to utilize an EGM to convert the printed ticket voucher(s) to a virtual ticket voucher associated with a gaming establishment account maintained for the user. In another such embodiment, the system enables a user that has one or more printed ticket vouchers to utilize an EGM to convert the printed ticket voucher(s) to an anonymous virtual ticket voucher associated with a mobile device.

In certain embodiments, the system enables an amount of funds deposited in a kiosk to be converted to one or more ticket vouchers. In one such embodiment, the system enables a user that has an amount of cash (or other forms of payment as disclosed herein) to utilize a kiosk to convert the cash to one or more ticket vouchers via the user depositing the amount of cash into the kiosk and then subsequently cashing out the deposited amount in exchange for a ticket voucher. In another such embodiment, the system enables a user that has one or more printed ticket vouchers to utilize a kiosk to convert the printed ticket voucher(s) to a virtual ticket voucher associated with a gaming establishment account maintained for the user. In another such embodiment, the system enables a user that has one or more printed ticket vouchers to utilize a kiosk to convert the printed ticket voucher(s) to an anonymous virtual ticket voucher associated with a mobile device.

In certain embodiments, the system enables an amount of funds provided to a gaming establishment interface, such as a casino desk or cage, to be converted to one or more ticket vouchers. In one such embodiment, the system enables a user that has an amount of cash (or other forms of payment as disclosed herein) to utilize a gaming establishment interface to convert the cash to one or more ticket vouchers via the user providing the amount of cash to the gaming establishment interface in exchange for a ticket voucher. In another such embodiment, the system enables a user that has one or more printed ticket vouchers to utilize a gaming establishment interface to convert the printed ticket voucher(s) to a virtual ticket voucher associated with a gaming establishment account maintained for the user. In another such embodiment, the system enables a user that has one or more printed ticket vouchers to utilize a gaming establishment interface to convert the printed ticket voucher(s) to an anonymous virtual ticket voucher associated with a mobile device.

In certain embodiments, the system enables an amount of funds provided to a retail interface, such as a kiosk or cashier at a retail establishment, to be converted to one or more ticket vouchers. In one such embodiment, the system enables a user that has an amount of cash (or other forms of payment as disclosed herein) to utilize a retail interface to convert the cash to one or more ticket vouchers via the user providing the amount of cash to the retail interface in exchange for a ticket voucher.

In certain embodiments, the system enables an amount of funds associated with a gaming establishment account maintained for the user, such as a gaming establishment retail account or a cashless wagering account, to purchase a ticket voucher. In these embodiments, the system enables a user to transfer an amount of funds from a gaming establishment account maintained for the user to a ticket voucher system in exchange for a ticket voucher.

It should be appreciated that in these embodiments wherein funds from one or more sources are potentially used to obtain a ticket voucher, when a user attempts to obtain one or more ticket vouchers, the system determines whether to authorize the exchange of an amount of funds for a ticket voucher. If the system determines not to authorize the exchange of an amount of funds for a ticket voucher, the system communicates a denial to the user and does not cause any ticket vouchers to be issued. On the other hand, if the system determines to authorize the exchange of an amount of funds for a ticket voucher, the system: (i) retains the amount of funds (if, for example, an amount of cash is exchanged at a kiosk for a ticket voucher); (ii) updates a credit balance to reflect the exchange of an amount of funds for a ticket voucher (if, for example, a credit balance of an EGM is being cashed out in exchange for a ticket voucher); and/or (iii) updates an account to reflect the exchange of an amount of funds for a ticket voucher (if, for example, a gaming establishment account associated with the user is exchanged for a ticket voucher). In these embodiments, following the exchange of an amount of funds for a ticket voucher, the system communicates an authorization to the ticket voucher system. Upon receiving data associated with the authorized exchange of an amount of funds for a ticket voucher, the ticket voucher system creates a ticket voucher associated with the exchanged amount of funds and stores data associated with the ticket voucher in one or more databases. Such a created ticket voucher is associated with ticket voucher identification information maintained by the ticket voucher system to identify that ticket voucher for subsequent validation upon a redemption of that ticket voucher.

It should be appreciated that since a created ticket voucher may take multiple forms, the system of the present disclosure includes multiple ways to convey such a created ticket voucher to the user. In one embodiment wherein the created ticket voucher takes the form of a paper ticket voucher, the ticket voucher system causes a ticket voucher printer to print the created ticket voucher. In another embodiment wherein the created ticket voucher takes the form of a virtual ticket voucher, the ticket voucher system communicates data to a device associated with the user, such as a mobile device running an application associated with the ticket voucher system, to transfer the created virtual ticket voucher to the user.

It should be further appreciated that the conversion of one or more ticket vouchers to one or more non-cash forms of payment utilizes one or more components of a ticket voucher system and/or one or more components of a mobile ticket voucher redemption system. Such components of the ticket voucher system and/or such components of the mobile ticket voucher redemption system include a controller including at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the ticket voucher system and/or the component of the mobile ticket voucher redemption system; (3) accessing memory to configure or reconfigure parameters in the memory according to indicia read from the component of the ticket voucher system and/or the component of the mobile ticket voucher redemption system; (4) communicating with interfaces and the peripheral devices (such as input/output devices); and/or (5) controlling the peripheral devices. In certain embodiments, one or more components of the controller (such as the at least one processor) reside within a housing of the component of the ticket voucher system and/or the component of the mobile ticket voucher redemption system, while in other embodiments, at least one component of the controller resides outside of the housing of the component of the ticket voucher system and/or the component of the mobile ticket voucher redemption system.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the ticket voucher system and/or the component of the mobile ticket voucher redemption system disclosed herein. In certain embodiments, the at least one memory device resides within the housing of the component of the ticket voucher system and/or the component of the mobile ticket voucher redemption system, while in other embodiments at least one component of the at least one memory device resides outside of the housing of the component of the ticket voucher system and/or the component of the mobile ticket voucher redemption system. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the ticket voucher system and/or the component of the mobile ticket voucher redemption system; (2) associations between configuration indicia read from a component of the ticket voucher system and/or the component of the mobile ticket voucher redemption system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the ticket voucher system and/or the component of the mobile ticket voucher redemption system to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the ticket voucher system and/or the component of the mobile ticket voucher redemption system to control the component of the ticket voucher system and/or the component of the mobile ticket voucher redemption system. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the ticket voucher system and/or the component of the mobile ticket voucher redemption system to implement at least part of the present disclosure. In other embodiments, part or all of the program code and/or the operating data is downloaded to the at least one memory device of the component of the ticket voucher system and/or the component of the mobile ticket voucher redemption system through any suitable data network described above (such as an Internet or intranet).

The at least one memory device also stores a plurality of device drivers. Examples of different types of device drivers include device drivers for the component of the ticket voucher system and/or the component of the mobile ticket voucher redemption system and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the ticket voucher system and/or the component of the mobile ticket voucher redemption system. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the ticket voucher system and/or the component of the mobile ticket voucher redemption system loads the new device driver from the at least one memory device to enable communication with the new device. For instance, one type of card reader in the component of the ticket voucher system and/or the component of the mobile ticket voucher redemption system can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate the specified component of the ticket voucher system and/or the specified component of the mobile ticket voucher redemption system components and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device and at least one pre-paid debit card dispenser; (2) at least one input device (which may include contact and/or non-contact interfaces) including at least one debit card/credit card reader; (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

Mobile Device Communications

As indicated above, in various embodiments, one or more actions occur between a mobile device and one or more components of the ticket voucher system and/or one or more components of the mobile ticket voucher redemption system, via one or more wireless communication protocols between the mobile device and the component of the ticket voucher system and/or the component of the mobile ticket voucher redemption system. In these embodiments, the mobile device application of the mobile device communicates ticket voucher identifying information to one or more components of the mobile ticket voucher redemption system and/or one or more components of the ticket voucher system over one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and/or one or more short range communication protocols (e.g., a near field communication ("NFC") protocol).

In certain embodiments, the communication with the mobile device can occur through one or more wireless interfaces of the component of the ticket voucher system and/or the component of the mobile ticket voucher redemption system. In one embodiment, the wireless interface is integrated into the cabinet of the component of the ticket voucher system and/or the component of the mobile ticket voucher redemption system and the processor of the component of the ticket voucher system and/or the component of the mobile ticket voucher redemption system is configured to communicate directly with and send control commands to the wireless interface. In another embodiment, the wireless interface is integrated into a device mounted to and/or within the cabinet of the component of the ticket voucher system and/or the component of the mobile ticket voucher redemption system. In certain embodiments where the wireless interface is embedded in a secondary device, the processor of the component of the ticket voucher system and/or the component of the mobile ticket voucher redemption system sends control commands to control the wireless interface via a secondary controller.

It should be appreciated that while certain data or information pertaining to one or more of the requested actions are communicated between a component of the ticket voucher system and/or the component of the mobile ticket voucher redemption system and a mobile device, such data or information may additionally or alternatively be communicated: (i) between one or more servers and a mobile device via one or more wireless communication protocols, or (ii) between a component of the ticket voucher system and/or the component of the mobile ticket voucher redemption system and one or more servers via one or more wireless communication protocols and then from one or more servers to a mobile device via one or more wireless communication protocols.

It should additionally be appreciated that any functionality or process described herein may be implemented via one or more servers, a component of the mobile ticket voucher redemption system, a component of the ticket voucher system, or a mobile device application. For example, while certain data or information described herein is explained as being communicated from a component of the ticket voucher system and/or a component of the mobile ticket voucher redemption system to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a component of the ticket voucher system and/or a component of the mobile ticket voucher redemption system, such functions, features or processes may alternatively be performed by one or more servers, or one or more mobile device applications, (ii) while certain functions, features or processes are described herein as being performed by one or more mobile device applications, such functions, features or processes may alternatively be performed by one or more servers, one or more components of the mobile ticket voucher redemption system or one or more components of the ticket voucher system, (iii) while certain functions, features or processes are described herein as being performed by one or more servers, such functions, features or processes may alternatively be performed by one or more components of the ticket voucher system, one or more components of the mobile ticket voucher redemption system or one or more mobile device applications, (iv) while certain functions, features or processes are described herein as being performed by one or more components of the ticket voucher system, such functions, features or processes may alternatively be performed by one or more components of the mobile ticket voucher redemption system one or more mobile device applications, or one or more servers, and (v) while certain functions, features or processes are described herein as being performed by one or more components of the mobile ticket voucher redemption system, such functions, features or processes may alternatively be performed by one or more components of the ticket voucher system one or more mobile device applications, or one or more servers.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:

a processor; and a memory device that stores a plurality of instructions that, when executed by the processor, cause the processor to:

receive ticket voucher data communicated from a mobile device, the ticket voucher data being associated with first information printed on a ticket voucher and stored by a gaming establishment ticketing system, independent of the receipt of the first information printed on the ticket voucher, receive authentication data communicated from the mobile device, and responsive to a determination that the received authentication data and the received ticket voucher data are each associated with the ticket voucher and a determination that the ticket voucher is available for a mobile device redemption, communicate data that results in an amount of funds associated with the ticket voucher to be associated with a payment instrument that is different from any amount of monetary currency.

2. The system of claim 1, wherein the memory device stores a plurality of further instructions that, when executed by the processor responsive to the determination that the received authentication data and the received ticket voucher data are each associated with the ticket voucher and a determination that the ticket voucher is unavailable for any mobile device redemption, communicate data that results in a display, by a display device, of a notification that the amount of funds associated with the ticket voucher are not redeemable in association with the payment instrument.

3. The system of claim 2, wherein the determination that the ticket voucher is unavailable for any mobile device redemption is based on the received authentication data not being associated with the ticket voucher a predetermined quantity of times.

4. The system of claim 2, wherein the determination that the ticket voucher is unavailable for any mobile device redemption is based on the amount of funds associated with the ticket voucher.

5. The system of claim 2, wherein the determination that the ticket voucher is unavailable for any mobile device redemption is based on a total amount of funds redeemed by a user in association with prior mobile device redemptions over a period of time.

6. The system of claim 1, wherein the payment instrument comprises a pre-paid debit card.

7. The system of claim 1, wherein the payment instrument comprises a credit card and the association of the amount of funds associated with the ticket voucher to the credit card comprises an original credit transaction.

8. The system of claim 1, wherein the authentication data comprises second information printed on the ticket voucher and stored by the gaming establishment ticketing system.

9. The system of claim 1, wherein during a first period of time, the authentication data comprises a first set of data and during a second, different period of time, the authentication data comprises a second, different set of data.

10. A system comprising:

a processor; and a memory device that stores a plurality of instructions that, when executed by the processor, cause the processor to:

receive ticket voucher data communicated from a mobile device, the ticket voucher data being associated with information printed on a ticket voucher and stored by a gaming establishment ticketing system, independent of the receipt of the information printed on the ticket voucher, receive authentication data communicated from the mobile device, responsive to a determination that the received authentication data and the received ticket voucher data are each associated with the ticket voucher and a determination that the ticket voucher is available for a mobile device redemption, communicate data that results in an amount of funds associated with the ticket voucher being associated with a form of payment separate from any amount of cash, and responsive to the determination that the received authentication data and the received ticket voucher data are each associated with the ticket voucher and a determination that the ticket voucher is unavailable for any mobile device redemption, communicate data that results in a display, by a display device, of a notification that the amount of funds associated with the ticket voucher are not redeemable in association with the form of payment separate from any amount of cash.

11. The system of claim 10, wherein the determination that the ticket voucher is unavailable for any mobile device redemption is based on at least one of: the received authentication data not being associated with the ticket voucher a predetermined quantity of times, the amount of funds associated with the ticket voucher, and a total amount of funds redeemed by a user in association with prior mobile device redemptions over a period of time.

12. A method of operating a system, the method comprising:

receiving ticket voucher data communicated from a mobile device, the ticket voucher data being associated with first information printed on a ticket voucher and stored by a gaming establishment ticketing system, independent of the receipt of the first information printed on the ticket voucher, receiving authentication data communicated from the mobile device, and responsive to a determination that the received authentication data and the received ticket voucher data are each associated with the ticket voucher and a determination that the ticket voucher is available for a mobile device redemption, causing, by a processor, an amount of funds associated with the ticket voucher to be associated with a payment instrument that is different from any amount of monetary currency.

13. The method of claim 12, further comprising, responsive to the determination that the received authentication data and the received ticket voucher data are each associated with the ticket voucher and a determination that the ticket voucher is unavailable for any mobile device redemption, displaying, by a display device, a notification that the amount of funds associated with the ticket voucher are not redeemable in association with the payment instrument.

14. The method of claim 13, wherein the determination that the ticket voucher is unavailable for any mobile device redemption is based on the received authentication data not being associated with the ticket voucher a predetermined quantity of times.

15. The method of claim 13, wherein the determination that the ticket voucher is unavailable for any mobile device redemption is based on the amount of funds associated with the ticket voucher.

16. The method of claim 13, wherein the determination that the ticket voucher is unavailable for any mobile device redemption is based on a total amount of funds redeemed by a user in association with prior mobile device redemptions over a period of time.

17. The method of claim 12, wherein the payment instrument comprises a pre-paid debit card.

18. The method of claim 12, wherein the payment instrument comprises a credit card and the association of the amount of funds associated with the ticket voucher to the credit card comprises an original credit transaction.

19. The method of claim 12, wherein the authentication data comprises second information printed on the ticket voucher and stored by the gaming establishment ticketing system.

20. The method of claim 12, wherein during a first period of time, the authentication data comprises a first set of data and during a second, different period of time, the authentication data comprises a second, different set of data.

* * * * *